G. S. SAYERS & T. GALLIGAN.
Clothes-Line Holder.
No. 203,503.　　　　　　　Patented May 7, 1878.
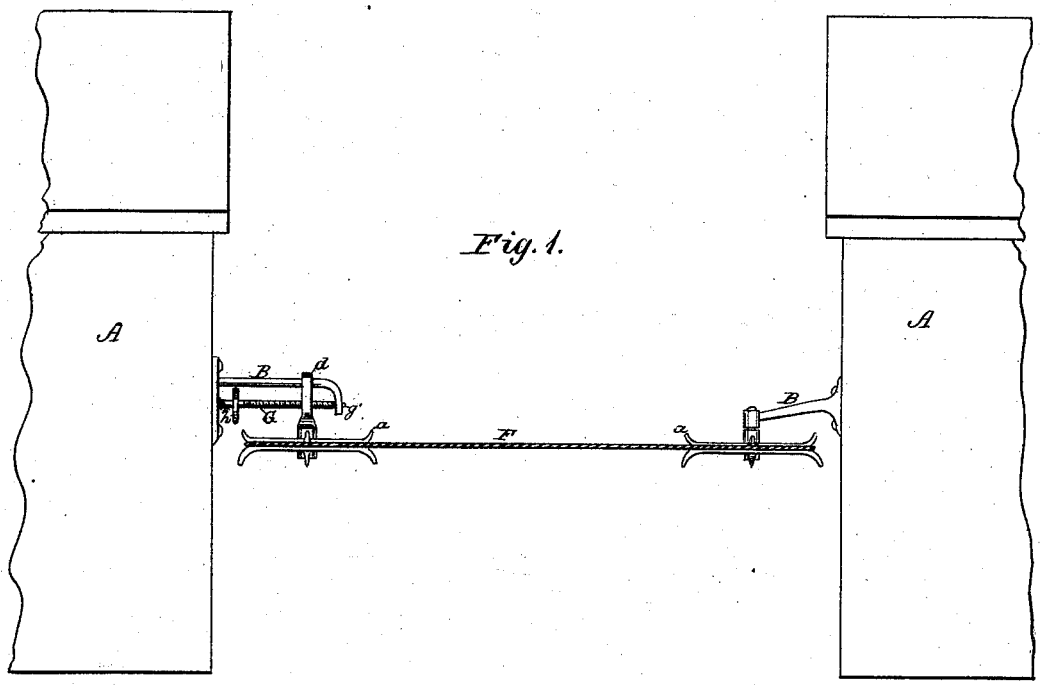
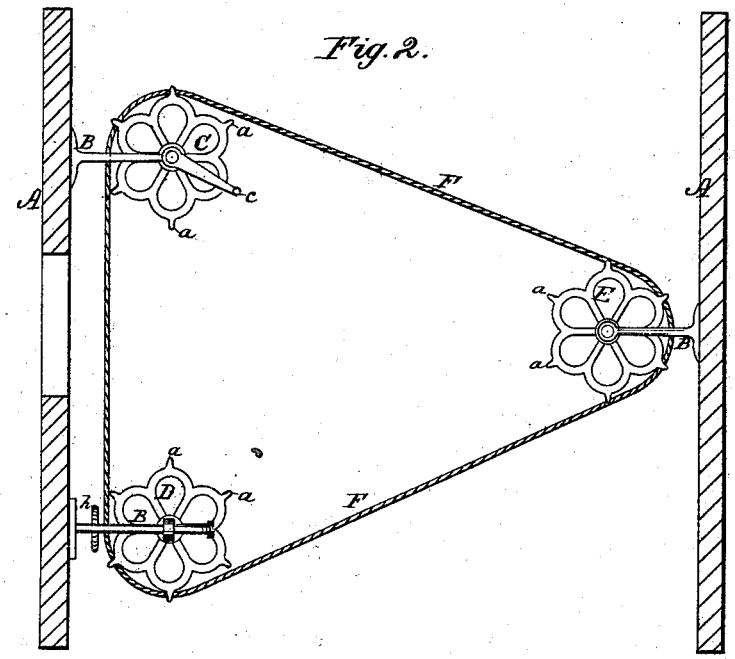
WITNESSES:　　　　　　　　　　　　　　INVENTOR:
W. W. Hollingsworth　　　　　　　　　G. S. Sayers
　　　　　　　　　　　　　　　　　　　　Thos. Galligan
　　　　　　　　　　　　　　　　　BY
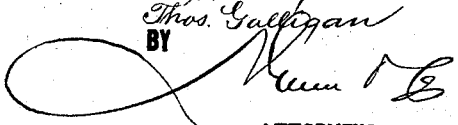
　　　　　　　　　　　　　　　　　　　ATTORNEYS.

UNITED STATES PATENT OFFICE.

GEORGE S. SAYERS AND THOMAS GALLIGAN, OF HYDE PARK, PA.

IMPROVEMENT IN CLOTHES-LINE HOLDERS.

Specification forming part of Letters Patent No. 203,503, dated May 7, 1878; application filed October 26, 1877.

*To all whom it may concern:*

Be it known that we, GEORGE S. SAYERS and THOMAS GALLIGAN, of Hyde Park, in the county of Luzerne and State of Pennsylvania, have invented a new and Improved Clothes-Line Hanger; and we do hereby declare that the following is a full, clear, and exact description of the same.

This invention is an improvement in the class of clothes-line holders in which the line runs around grooved or spur wheels mounted horizontally on fixed arms or brackets, so that the line may be made to travel around the wheels, and thus enable it to be filled with clothes by a person remaining at one point in the circuit.

The improvement relates to the construction and arrangement of parts whereby one of the wheels is made adjustable along its supporting arm or bracket for tightening or slackening the line, as occasion requires.

In the accompanying drawings, forming part of this specification, Figure 1 is a side view, and Fig. 2 a plan view, showing the application of our invention.

In the drawings, A A represent the sides of two opposite houses or other buildings or structures, to which are attached the horizontal arms B, supporting the upper ends of the axles of the wheels C, D, and E, each provided around its circumference with a series of opposite spurs, *a a*, in the notches between which the clothes-line F travels. The wheel C is provided with the crank-handle *c*, by means of which motion is given to the device. Said handle may be fitted to the axle either above or below the wheel. The axle *d* of the wheel D is swung from its supporting-arm B by means of the latter passing through a hole in its upper end, so that it travels freely along said arm in either direction. Below and parallel to the arm the adjusting-screw G is journaled at one end in the house, and at the other, *g'*, in the downwardly-bent end of the arm B, thus passing through the axle *d*, and rendering it and its attached wheel horizontally adjustable on the arm B. Motion is imparted to the screw G by means of the milled wheel *h*, and by this arrangement the clothes-line F may be tightened or loosened, as desired.

The wheels are so constructed that line F may be readily applied to or removed from them.

We are aware that the journal or bearing blocks of shafts and pulleys have been adjusted by screws or windlass for the purpose of tightening belts or cords.

Having thus described our invention, what we claim as new is—

In combination with the clothes-line and fixed pulleys C E, the horizontal arms or bracket B, the pulley D, whose axle *d* is adapted to slide on said arm, and the screw G, passing through the axle, and provided with the wheel *h*, all as shown and described.

GEORGE S. SAYERS.
THOS. GALLIGAN.

Witnesses:
  D. J. LEWIS,
  D. G. DYKE.